(12) United States Patent
Chervirala et al.

(10) Patent No.: US 9,881,050 B2
(45) Date of Patent: Jan. 30, 2018

(54) METHOD AND SYSTEM TO RECOMMEND APPLICATIONS FROM AN APPLICATION MARKET PLACE TO A NEW DEVICE

(75) Inventors: Srinivas Chervirala, Sunnyvale, CA (US); Satya Mallya, San Jose, CA (US); Wencheng Li, Santa Clara, CA (US)

(73) Assignee: ORANGE, Paris (FR)

( * ) Notice: Subject to any disclaimer, the term of this patent is extended or adjusted under 35 U.S.C. 154(b) by 102 days.

(21) Appl. No.: 13/882,390

(22) PCT Filed: Oct. 21, 2011

(86) PCT No.: PCT/IB2011/002955
§ 371 (c)(1),
(2), (4) Date: Sep. 17, 2013

(87) PCT Pub. No.: WO2012/056324
PCT Pub. Date: May 3, 2012

(65) Prior Publication Data
US 2014/0006434 A1    Jan. 2, 2014

Related U.S. Application Data

(60) Provisional application No. 61/408,565, filed on Oct. 29, 2010.

(51) Int. Cl.
*G06F 17/30* (2006.01)
*G06Q 30/02* (2012.01)
(Continued)

(52) U.S. Cl.
CPC .......... *G06F 17/30386* (2013.01); *G06F 8/61* (2013.01); *G06Q 30/02* (2013.01); *G06Q 30/0631* (2013.01)

(58) Field of Classification Search
CPC ..... G06F 17/30386; G06F 8/61; G06Q 30/02; G06Q 30/0631
(Continued)

(56) References Cited

U.S. PATENT DOCUMENTS

2007/0256058 A1    11/2007  Marfatia et al.
2008/0147530 A1*    6/2008  Kwan et al. ............. 705/34
(Continued)

FOREIGN PATENT DOCUMENTS

EP        1215575 A2    6/2002

OTHER PUBLICATIONS

International Search Report and Written Opinion dated Feb. 17, 2012 for corresponding International Application No. PCT/IB2011/002955, filed Oct. 21, 2011.
(Continued)

*Primary Examiner* — Grace Park
*Assistant Examiner* — Aida Tessema
(74) *Attorney, Agent, or Firm* — David D. Brush; Westman, Champlin & Koehler, P.A.

(57) ABSTRACT

A method and system for populating a second electronic device of a user with applications from a second application platform said second electronic device is operating with, using applications installed on a first electronic device of said user, said first electronic device operating with a first application platform. The method is carried out by an application recommendation node.

9 Claims, 6 Drawing Sheets

(51) Int. Cl.
*G06F 9/445* (2006.01)
*G06Q 30/06* (2012.01)

(58) Field of Classification Search
USPC .......................................................... 707/758
See application file for complete search history.

(56) References Cited

U.S. PATENT DOCUMENTS

| | | | |
|---|---|---|---|
| 2008/0214163 A1* | 9/2008 | Onyon et al. | 455/414.2 |
| 2008/0250323 A1* | 10/2008 | Huff | 715/733 |
| 2008/0313257 A1* | 12/2008 | Allen et al. | 709/201 |
| 2009/0106110 A1* | 4/2009 | Stannard et al. | 705/14 |
| 2010/0146442 A1 | 6/2010 | Nagasaka et al. | |
| 2010/0210240 A1* | 8/2010 | Mahaffey | H04L 41/0253 |
| | | | 455/411 |

OTHER PUBLICATIONS

European Office Action dated Sep. 2, 2016 for corresponding European Application No. 11805588.8.

\* cited by examiner

METHOD AND SYSTEM TO RECOMMEND APPLICATIONS FROM AN APPLICATION MARKET PLACE TO A NEW DEVICE

CROSS-REFERENCE TO RELATED APPLICATIONS

This Application is a Section 371 National Stage Application of International Application No. PCT/IB2011/002955, filed Oct. 21, 2011, which is incorporated by reference in its entirety and published as WO 2012/056324 on May 3, 2012, in English, and which is based on and claims the benefit of U.S. provisional patent application Ser. No. 61/408,565, filed Oct. 29, 2010, the content of which is hereby incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE PRESENT INVENTION

The present invention generally relates to applications running on an electronic device and more specifically to the recommendation of such applications.

BACKGROUND OF THE PRESENT INVENTION

With the success of an application market place like the Apple AppStore™, it is anticipated that Operators and Handset manufacturer will come up with application market places of their own. Application market places—app store or app platform in short—provide an opportunity to reach users more directly than the more traditional approach consisting in populating an electronic device with a ready to use set of applications. However, the exponential growth of applications available on market places creates the problem of discovery of interesting applications for most users.

A device user, such as a mobile phone or smart phone user, has to rely heavily upon rating systems to discover the popular applications in the market place. Today, when a user is looking for an application, he will need to enter keywords based on his interests to search for applications matching these keywords. Using the example of the Apple AppStore™, a user can seek through Itunes™ on his computer for instance or through the AppStore™ application on his iPhone™, for an application using a keyword search. Itunes™ will return a list of hits and the user will have to choose, for instance based on ratings, an application matching his own interests.

A user may need a great amount of time to populate his electronic device, like his mobile phone, with applications he likes and uses frequently. Applications are mostly today app store specific, i.e. an electronic device is generally operating with one given application store. The situation is also true for an operating system (OS) as most operating systems developed for smart phones are associated with a specific application store. A problem arises when a user decides to move to another electronic device operating with a different OS and consequently a different application store. Indeed he will have to populate the new device with the same or similar applications if he wants to retrieve an application environment he is familiar with. As the new app store may be configured differently, he may need to spend again a great amount of time to discover the applications he likes in the new application store.

For example, a user with an iPhone™ or an iPad™ from Apple may decide to switch to an Android™ mobile phone. He may for instance like the New York Times or Le Monde news apps available on the Apple app store. His new mobile phone may be configured to operate with the Android application store. As these applications exist on the Android™ store, he can find them using a manual search. But with many applications available on his former mobile device, this user will have systematically to repeat the search he did on the Apple application store to repopulate the new mobile phone with the same or similar applications.

Operators estimate today that up to a third of their customers when changing phones move to other electronic devices. When it comes to smart phones operating with lots of applications, customers may think twice before changing to a mobile with a different OS, as they are at risk of losing the application environment they like.

There is still a need today to improve the recommendation of applications when a user switches to a new electronic device. There is a further need for a novel recommendation engine that takes into account the applications the user was familiar with on his previous device.

SUMMARY OF THE PRESENT METHOD AND SYSTEM

It is an objective of the present method and system to overcome disadvantages and/or make improvements in the prior art.

To that extend, the present method relates to a method for recommending applications on user new device/platform based on the applications on his or her previous device/platform and the affinity (usage & frequency) with those apps.

Thanks to the present method, the user of the electronic device can populate a second electronic device with applications similar to the ones he is familiar with on this first electronic device. In other words, he is presented with a starter package of applications that is time saving and recreates an application environment he is familiar with.

The present system also related to a recommendation node

The present system also relates to a telecommunication system comprising:
  an electronic device hosting at least a first application,
  an application category database comprising a plurality of application categories for indexing applications available to the electronic device,
  a recommendation node for recommending a second application to the electronic device, the second application being indexed with one of more application categories in the application category database, said recommendation node being arranged to:

The present system also relates to a computer readable carrier

BRIEF DESCRIPTION OF THE DRAWINGS

The present system and method are explained in further detail, and by way of example, with reference to the accompanying drawings wherein.

DETAILED DESCRIPTION OF THE PREFERRED EMBODIMENTS

Figure 1:
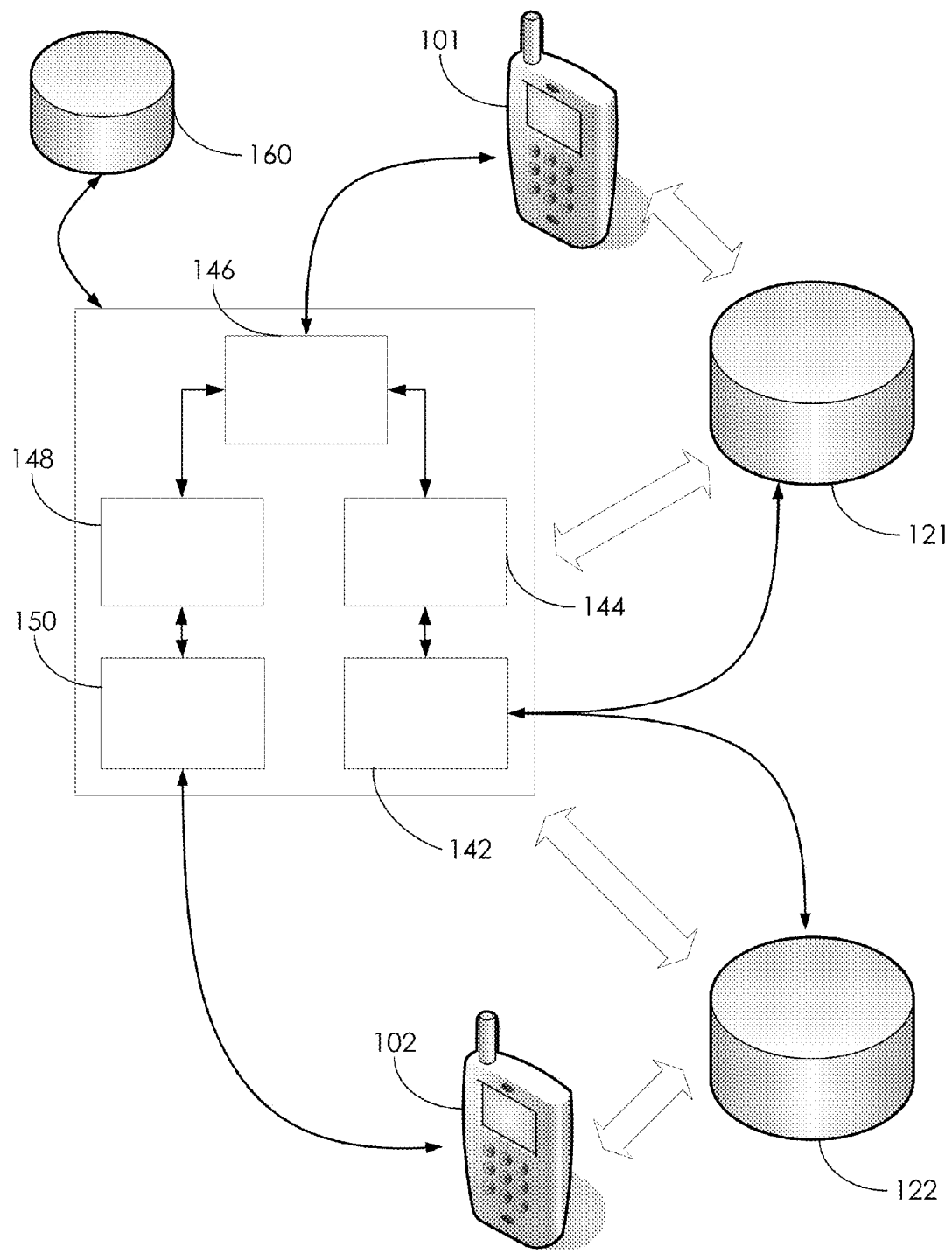
FIG. 1 shows an exemplary embodiment of the present system.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. In another example, an operative coupling may include a wired and/or wireless coupling to enable communication between an application market server, the starter service node of the present system and one or more user devices.

Unless specified otherwise, the exemplary embodiment here after will be described in its application to a mobile device operable to select and download via a telecommunication network applications from an application market place, also referred to here after as an app store or platform. The mobile device will also be referred to as a user or electronic device. An application market client hosted by said mobile device may be used to facilitate the selection and download of applications.

The present exemplary embodiment is in no way a limitation of the scope of the present method and system as the present teachings could be implemented for other electronic or telecommunication devices, such as computers, laptops, PDAs (Personal Digital Assistants), pads (like the iPad™ from Apple), set top box and the likes. More generally any electronic device having connection means for accessing distant application market servers over a telecommunication network and downloading applications therefrom may benefit form the present teachings.

The expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the mobile device display.

In addition, it should be expressly understood that the drawings are included for illustrative purposes and do not represent the scope of the present system.

FIG. 1 shows an illustration of an exemplary embodiment of the present system. A first telecommunication device 101, illustrated as mentioned before as a mobile device, may access through a telecommunication network (not shown on FIG. 1) a first application market place—or app store—hosted by an application market server 121. The Apple AppStore™ is a known example of such an application market place. Such a server 121 may store a large number of applications that can be downloaded to the first mobile device 101 over the telecommunication network. Subsequently to its download, the user may invoke and execute the application added to his device 101. Today a large number of such applications are available and can perform tasks varying from games, location based services, call services, news, social network interfaces to music and video players and the likes.

A second telecommunication device 102, illustrated as a mobile device, may access through another telecommunication network (same or different than the previous one, and not shown on FIG. 1) a second application market place—or app store—hosted by an application market server 122. The second mobile device 102 is assumed to be different than the first one, i.e. for instance operating with a different OS (operating system) and/or operating with different app stores.

The first mobile device 101 is assumed to be the user's former device, already populated with a plurality of first applications from the first application store 121, while the second mobile device 102 is assumed to be the user's new device, operating with the second app store 122.

A starter service node 140—or SSN—may be available in either telecommunication network to provide an application starter package to the second mobile device of the present system. This starter package comprises a list of applications from the second app store 122 that are similar to the applications currently available on his first mobile device. This starter package—or starter list—allows the user to populate the second electronic device 102 more easily with new applications similar to the ones he is familiar with.

The present method may be available through an application starter service (offered by the SSN 140) that the user of the first mobile device 101 can subscribe to whenever acquiring a second mobile device 102. The present starter service node 140 acts as an application recommendation node in the telecommunication network and may comprise a number of parts or components as follows:

application crawlers 142 for discovering and collecting for all applications from the application market servers 121 and 122 application metadata describing them, a cross platform classification manager 144 that uses the application metadata collected by the application crawlers 142 to index, i.e. link, the applications across app stores. Thanks to manager 144, one or more applications from the first store 121 can be linked to one or more applications from the second store using a similarity criterion. As mentioned before, each application performs one or more functions.

The similarity criterion may measure the similarities between functions thanks to the metadata collected by the application crawlers. The metadata may consist for instance of the application description, including its name, as available in most app stores. The similarity criterion, using a semantic tool to interpret application descriptions, may comprise the comparison of the application descriptions between apps from the first and second stores. Thus the New York Times app available on the Apple App Store™ may be found similar to the application of the same name available on the Android Store™, even if some of their respective functions are not common. Other technologies, based on NPL (natural processing language) may be used to interpret the application metadata across application stores and find similarities among application functions from each store. The indexing, i.e. links between applications, may be stored in the starter service database—or application database—160 operatively linked to SSN 140, an application analyzer module 146, that shall gather and process application metadata from the first mobile device 101, the application metadata describing the applications available on said device 101. The application metadata may be collected through an application reader client ARC (not shown in FIG. 1) available on the device and provided by the present starter service node 140. Indeed whenever the user registers his first electronic device 101 to the application starter service—starter service in short—through the SSN 140, an application reader client may be downloaded to collect application metadata. This client will transfer the collected application metadata to SSN 140 for subsequent analysis upon request from the SSN 140. The request may be on an application per application basis or for all applications present on the first mobile device (a list is then returned). The ARC will also determine which app store the first mobile device 101 is operating with, and inform the application analyzer module 140 accordingly, an application finder module 148 that will be used to determined for each first application AP1 available on the first mobile device 101 (based on the application metadata collected on the first mobile device 101 by the application reader client) one or more second applications AP2 linked to AP1 in the starter service database 160. As explained before, a second application AP2 linked to the first application AP1 is an application similar to the first application, based on the similarity criterion used by the cross platform classification manager 144 here above, an application recommendation module 150 that will determine a list of applications AP2 from the second app store 122 to push to the second mobile device 102. To do so, the SSN 140 may provide through its application recommendation module 150 a starter service client that is pushed to the second mobile device 102 once the user lists or registers this device with the SNN 140. Once activated, the starter service client SSC (not shown in FIG. 1) will determine the application store 122 the second mobile device 102 is operating with and send the information to the application recommendation module 150. The application recommendation module 150, knowing the app store from the second mobile device 102 as well as the applications AP1 available from the first mobile device 101 (thanks to the application analyzer module 146), will request from the application finder module 148 the determination of one or more applications from the second application store 122 similar the applications AP1 available on the first mobile device 101. The list of applications may be provided, e.g. pushed, to the second mobile device for selective (by the user) or automated download (using the starter service client for instance). Alternatively, the list may be pushed to the first electronic device 101.

One may note that the present system is illustrated with the indexing of applications available on two app stores. The starter service database may store indexing for two or more app stores available today to users. Thus the starter service may be available for instance to a network operator offering a variety of electronic devices supporting different operating systems (OSs) and consequently different app stores. The network operator may for instance provide new electronic devices already equipped with the starter service client that will determine the identity of the second app store 122 and provide it to the SSN 140.

In an additional embodiment of the present system, usage data corresponding to the actual usage by the user of the different applications available on the first electronic device 101 may also be collected by the ARC. This usage data will be further analyzed by SSN 140 to determine, based on preset application usage rules, what applications to push to the second electronic device 102. Thus applications with less frequent usage may be discarded by the SSN 140. The usage rules may be preset by the operator offering the starter service or by the user himself when subscribing to said service. The application finder module 148 may select among the applications AP1 from the first mobile device 101 the ones satisfying the usage data preset rules. The resulting shorter list of first applications will results in a shorter list of second applications from the second app store that can be presented to the second mobile device 102.

In an alternative embodiment of the present system, the metadata as well as the usage data for a first application AP1, may be gathered from the operator network the first device is registered with. For instance, the Customer Resource Management (CRM) data available at the network level for any user may be analyzed to determine the applications downloaded to the first mobile device 101 as well as the usage data for each application. Alternatively, the applications available on the first mobile device may be directly determined from the first app store 121 through the user purchase history available from his user account with the store.

Application crawlers 142 and the cross platform classification manager 144 correspond to the interface of the starter service node 140 with the different application market servers 121 and 122. As mentioned before, more application market stores may partner with SSN 140 to offer the starter service to a large diversity of electronic devices. The application analyze module 146 corresponds to the interface with the first mobile device 101 while the application recommendation module 150 corresponds with to the interface with the second mobile device 102.

One may note that illustrating the SSN 140 as a five part server is a mere illustration highlighting the different functionalities of the present SSN. This is in no way limiting as the five parts may be one of the same software or hosted on different elements of the starter service node 140. For instance the crawlers 142 may be hosted on different nodes of the present telecommunication network and may vary depending on the application market place being discovered.

Figure 2:
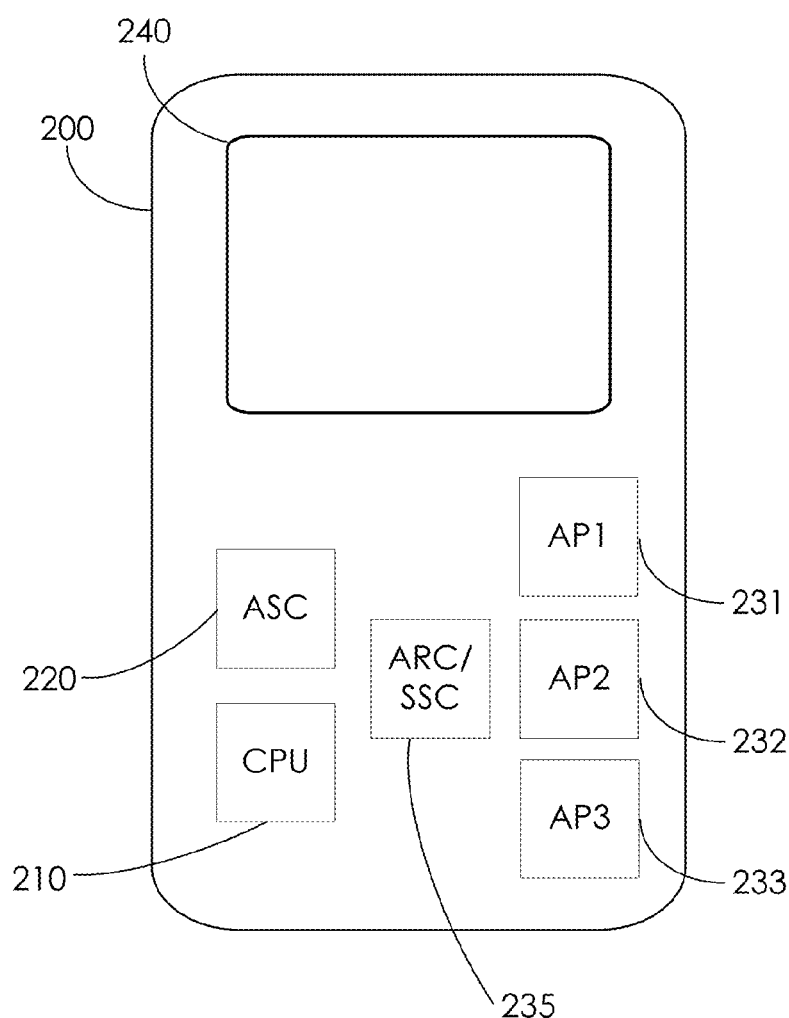
FIG. 2 shows an exemplary embodiment of an electronic device in the present system.

FIG. 2 is an illustration of an exemplary embodiment of the user—or electronic—device used in the present system. User device 200 may be either the first mobile device 101 or the second mobile device 102. Mobile device 200 may comprise a display 240 for presenting a Graphical User Interface (GUI) of an application program to a user of this device. A processor 210 (or Computational Processing Unit)

is also provided for controlling and rendering the GUI presented to the display 240. The display 240 may be a touch panel. Touch panel 240 can be seen as an input device allowing interactions with a finger of a user or other devices such as a stylus. Such an input device can, for example, be used to make selections of portions of the GUI. The input received from a user's touch is sent to the processor 210 that interprets the touches in accordance with the application program (AP) corresponding to the GUI. For example, the processor 210 can initiate a task, i.e. a control of the AP, in accordance with a particular touch. More generally, processor 210 is provided for running the Operating System (OS) of the mobile device 200.

A touch panel or keyboard, or keypad (not shown in FIG. 2) may also be provided to control one or more APs running on the processor 210 of mobile device 200.

An application store client 220 (ASC) may be provided for interaction with the application market place 121 or 122 of FIG. 1. Such a client, like the AppStore™ client available today on an iPhone™, will allow the user to search and browse the different applications available for download. This ASC 220 will also deal with payments for applications that necessitate such a payment prior to download. In the present illustration of FIG. 2, a number of applications, for instance AP1 231, AP2 232 and AP3 233 have been downloaded on the mobile device 200 by the user. Interactions with the GUI of an AP using for instance touch panel 240 or the keyboard will participate in generating the usage data that may be monitored by the application reader client ARC 235 shown in FIG. 2 (assuming user device 200 is the first mobile device 101). Assuming FIG. 2 is an illustration of the second mobile device 102, the starter service client SSC 235 may be used to obtain from the starter service node 140 the list of application from the second app store 122 that can populate the user device 200 to help the user retrieve an application environment he is familiar with.

Figure 3A:
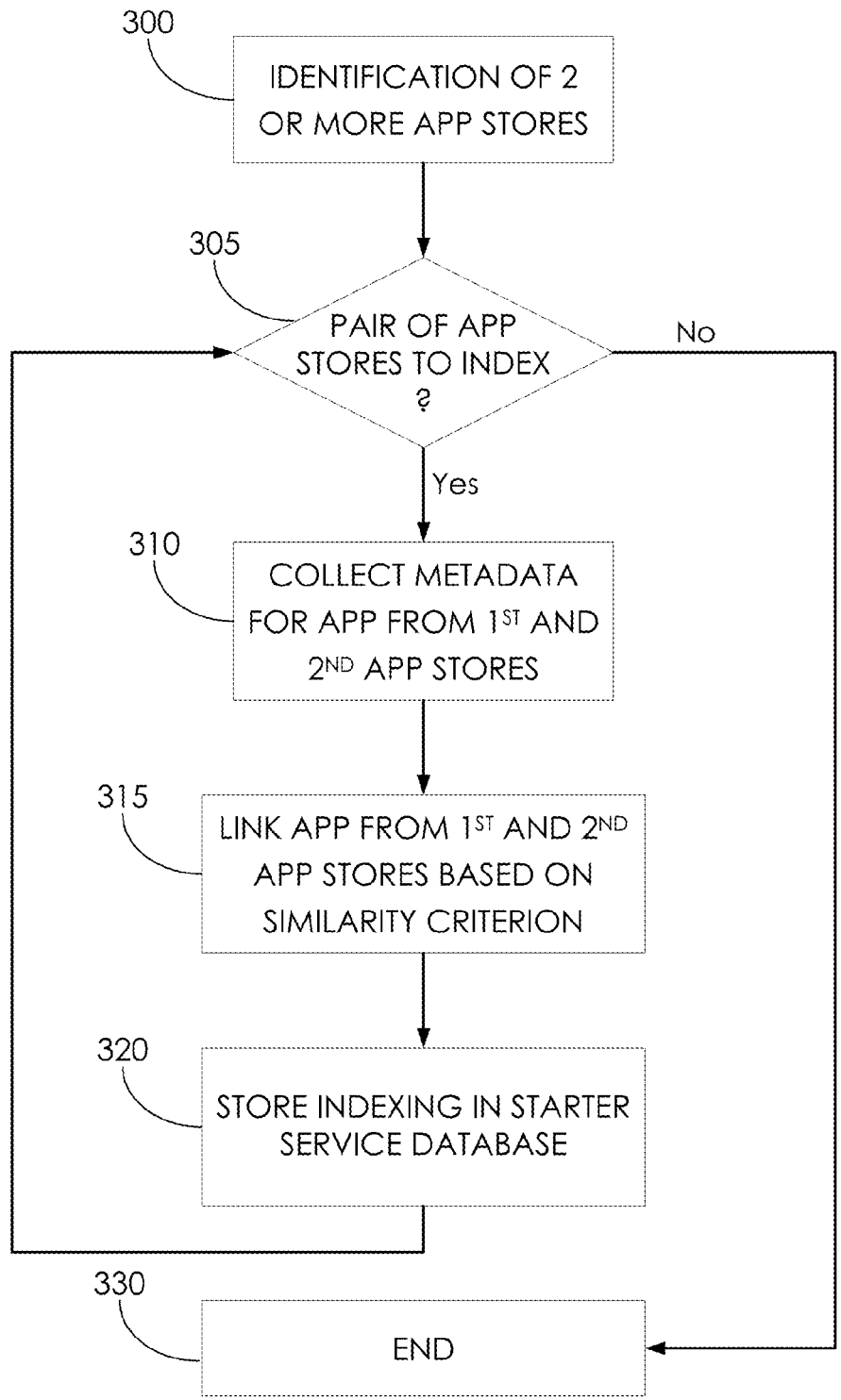
FIG. 3 shows an exemplary flowchart for indexing application across different app stores according to a first embodiment of the present method.

FIG. 3 is an illustration of an exemplary embodiment of the application indexing across app store in the present system. This indexing is carried out by the SSN 140 and more specifically the application crawlers 142 and the cross platform classification manager 144. In a preliminary act 300, different application market servers, like application market servers 121 and 122 from FIG. 1, are registered with the starter service node 140. In a further act 305, the SSN 140 may proceed with indexing the applications across app stores by pairs. First and second app stores 121 and 122 respectively will be discovered through application crawlers 142 in a subsequent act 310 to collect application metadata. The metadata is used to compare applications across the app stores and find similarities. It may consists of application name, characteristics of the applications, description of the different application functions, user comments, information about application developers . . . .

In a further act 315, a preset similarity criterion will be applied to the collected metadata to link applications across the two app stores. This may be carried out through determining—for each application of a first store—applications in the second stores that are found similar based on the preset similarity criterion. For instance, for a given first application AP1 from the first app store 121, the cross platform classification manager 144 will browse all applications AP2 from the second app store to find applications whose functions are similar. The indexing may be performed both ways so that each application from the first app store is linked with one or more applications from the second store, and reversely.

In an additional embodiment of the present system, the applied similarity criterion may allow to link applications whose functions are syntactically similar, a function being syntactically similar to another function when their respective metadata present syntactic similarities. In another embodiment of the present system, the preset similarity criterion may be based on an NPL engine that is applied to the collected metadata to find similarities among application characteristics and descriptions. A very basic similarity criterion could be based on the application and/or developers' name.

A similarly criterion is needed as similar applications may be described in different ways from app store to the other. Indeed, an application developed by the same application provider/developer may be described using different wording when made available on different app stores. Furthermore, two "linkable" applications AP1 and AP2 may even present core functions that are similar while having additional functions only available per app store. The similarity criterion may be chosen loose enough to allow the linking of applications with a small number of common core functions. Reversely, the similarity criterion may be chosen narrow or strict enough to allow the linking of applications proposing the exact same functions. One will understand that with a loose similarity criterion, the list of applications from the second app store provided to the user may be significantly more populated than with a SSN running with a strict similarity criterion.

In a further act 320, the found links will be stored in the starter service database 160 of FIG. 1. The information stored in the starter service database (or application database) may be limited to pairs of application names if the information is enough to fully identify each application of the pair in their respective app store.

Some or all of the application metadata may be also stored for each linked application. Overall the information stored for each application should be enough to uniquely identify said application in its app store.

Once all applications from the first and second app stores are linked, act 305 will be carried out again to seek for another pair of applications market places to index. Provided a third app store is registered, the acts 310 to 320 will be carried out at least 3 times to index all pairs of app stores.

Once all app stores are indexed, the indexing will end in a further act 330. Thanks to the application indexing illustrated here above, the application database 160 links a plurality of applications from the first application platform with another plurality of applications from the second applications platform, the links being based on a similarity criterion measuring similarities among the application functions.

Figure 4:
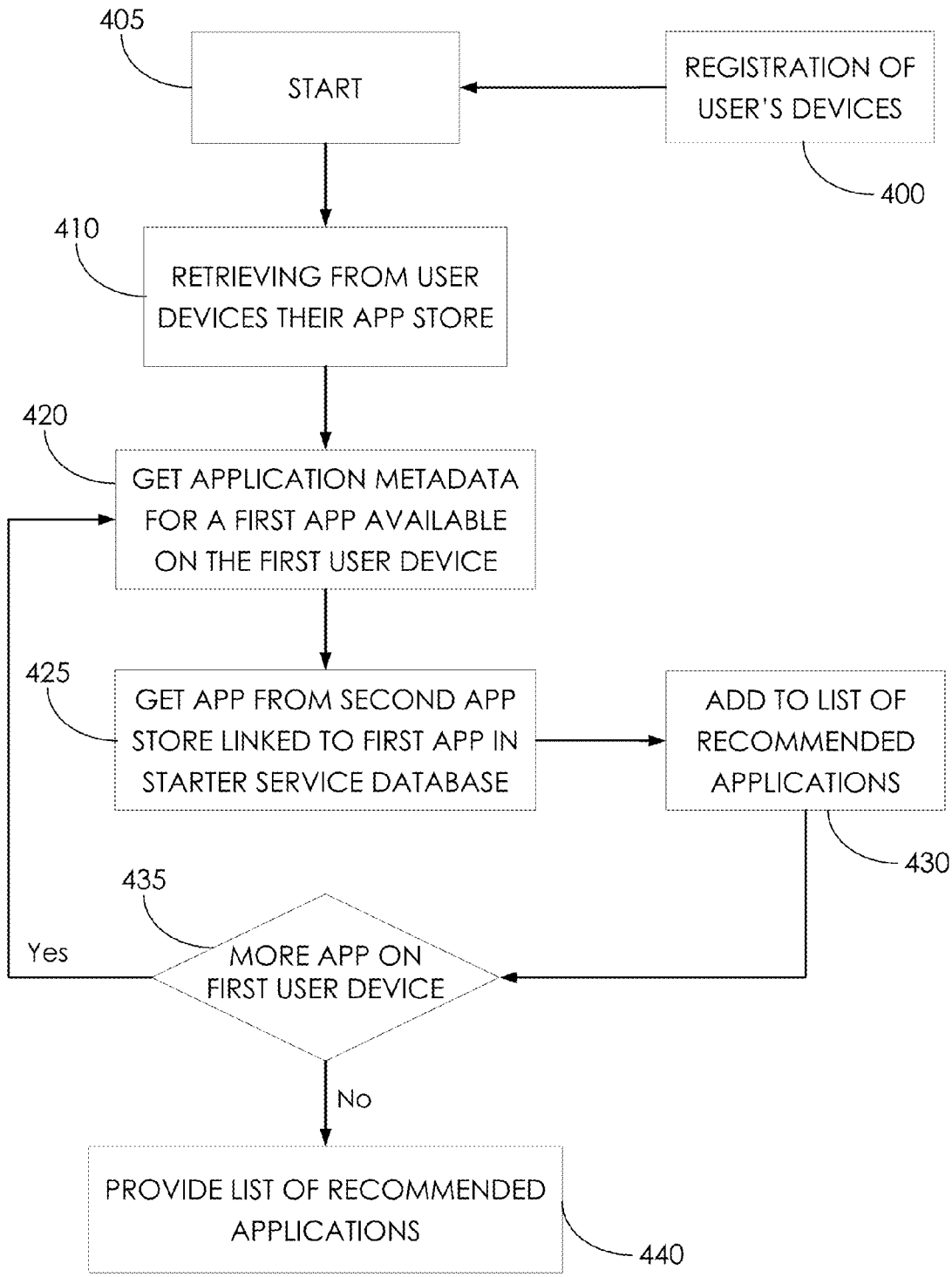
FIG. 4 shows an exemplary flowchart according to a first embodiment of the present method.

Once the applications from both app stores 121 and 122 are linked, the present starter service may be implemented. FIG. 4 is an illustration of a first exemplary embodiment of the present method. In a preliminary act 400, a user will register his first and second mobile device with the present starter service node 140. As in FIG. 1, the first device is the one already populated with an application environment the user is familiar with while the second device is his new device. The first and second devices are also assumed to operate respectively with the first and second app stores 121 and 122. The registration act 400 will allow the provision by the SSN 140 of the clients on each device:

the application reader client ARC for collecting information about applications AP1 from the first app store available on the first mobile device, the starter service client SSC for determining which second app store the second mobile device operates with as well as receiving the second applications list from the application recommendation module 150.

The registration act may be carried online through a portal access to the starter service of the present system. Other device registration method may be readily available to the man skilled in the art. For instance, the user may register his mobile devices through a user interface provided on either the first or second user device by the respective clients ARC or SSC.

In a subsequent and optional act 405, the user may trigger the starter service through e.g. a user interface proposed by either agent on the first or second mobile device, or through an online access to the starter service portal using a personal computer. Alternatively, the download of the respective agents may cause the starter service to proceed with the next acts. Once the starter service is activated, a starter list may be initiated to null. The starter list will comprise the list of applications from the second app store 122 to be pushed to the second mobile device.

Once the starter service is triggered, the SSN 140 will, in a subsequent act 410, determine from the second mobile device registered with the user the app store this second mobile device operates with. This may be achieved through the SSC installed on the second device that can collect information about the second device (manufacturer, operating system . . . ) and send it to the starter service node that can subsequently determine the second app store. This may also be determined concomitantly during registration of the first and second devices through the downloaded client SSC or through direct input from the user when providing his profile information. In the event the determined second store is not indexed, this may trigger the indexing of FIG. 3 prior to any application recommendation from that store. The first application store will also be determined during act 410. The same determination principles may be used, e.g. using the client ARC on the first mobile device or after registration of the first mobile device with the starter service.

In a further act 420, the SSN 140 will receive first metadata describing a first application AP1 under review available on the first mobile device 101. This metadata will be sent by the ARC to the application analyzer module 146 upon request from the SSN 140. One may note that the metadata collected for a first application available on the first mobile device may be similar or different from the metadata describing the same application in the first app store. Indeed, the metadata collected to index the applications may be richer in order to determine the similarities across app stores, while the metadata collected by the ARC may be limited as it is only needed to identify the first application AP1 in the starter service database 160. Indeed, provided the name is enough to uniquely identify the application in its app store, collecting the application name through the ARC will be enough to retrieving indexing data from the starter service database 160. The metadata may be completed from the application name by checking into the first app store 121 the description corresponding to that name.

In a further act 425, the SSN 140, through its application finder module 148, and using the received first metadata, will retrieve at least one application AP2 from the second app store 122 linked with the first application AP1. The one or more found second applications AP2 will be added in a further act 430 to a "starter" list of recommended applications.

Provided more applications AP1 are available on the first mobile device (answer Yes to act 435), the present method will resume with act 420. When no more first application AP1 remains to be discovered on the first mobile device (answer No to act 435), the present method will end with the provision of the starter list to the second mobile device in act 440. The starter list may be enriched with addresses in the second app store to retrieve each of the recommended second applications AP2. Alternatively, the starter list may be enriched with information intended to the app store client available on the second device for a quick download of the corresponding application. Provided an automated download is chosen by the user, the starter list, when processed by either the SSC client or the ASC client provided on the second mobile device 102, will cause the download of all the recommended applications in the second store.

In an alternative embodiment of the present method, the starter list may be provided to a subscriber identity, like a SIM card, of the first mobile device. This embodiment is of a particular interest if the second mobile device will be operated using the same SIM card (if the user is for instance staying with the same operator, and just changing mobiles and consequently OS). Once the SIM card is placed in the second mobile device, the starter service client SSC may be arranged to check the SIM card for the starter list and provided it is found, starts the download process to populate the second mobile device 102 with the recommended applications AP2. Alternatively, this alternative embodiment may be carried out by the app store client ASC on the second mobile device 102.

Figure 5:
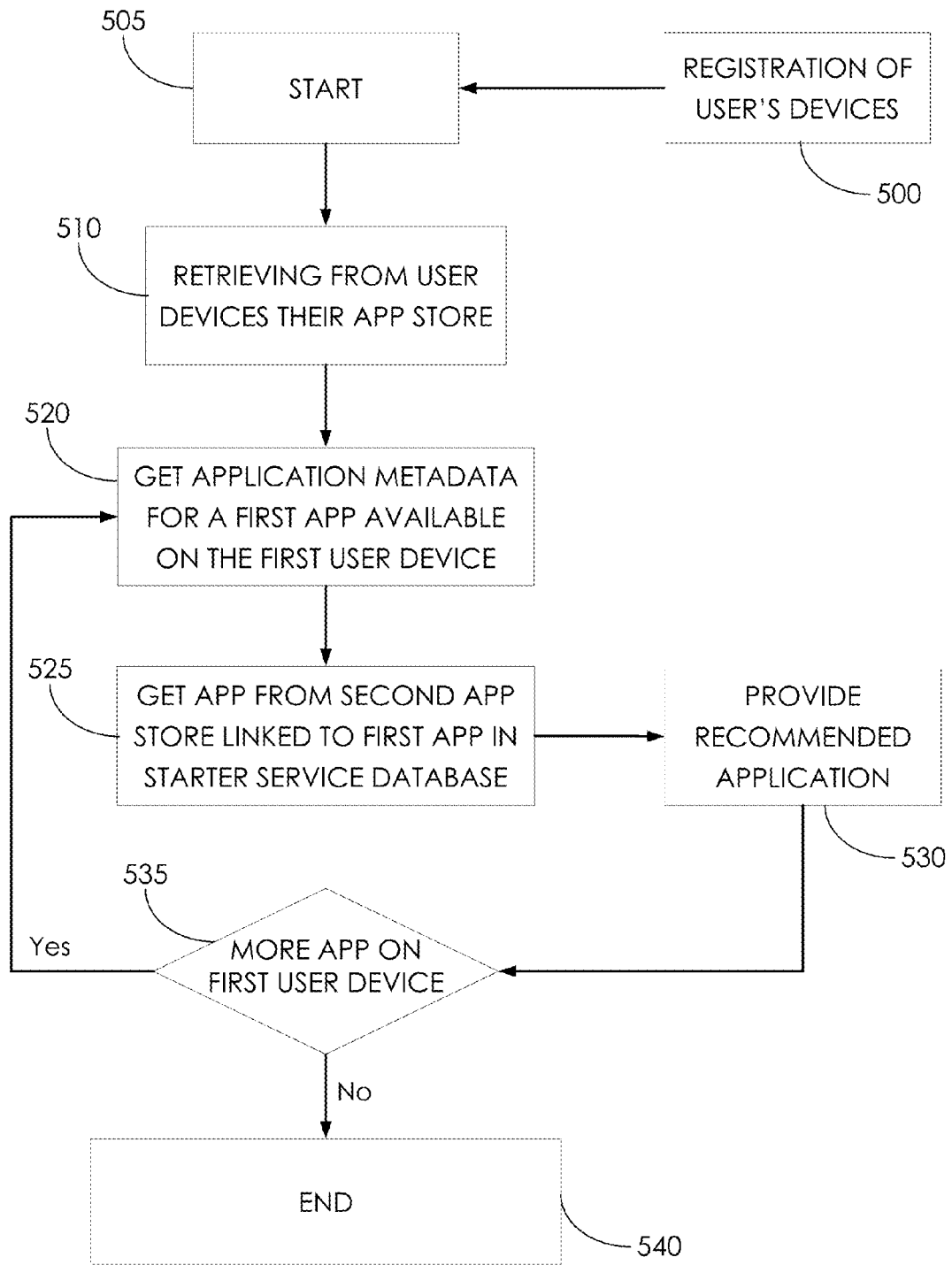
FIG. 5 shows an exemplary flowchart according to a second embodiment of the present method.

An alternative embodiment of the present method is illustrated in FIG. 5. Acts 500 to 525 correspond respectively to the same act 400 to 425. The main difference is with the subsequent act 530, once one or more second application AP2 from the second app store have been found to be linked to the first application AP1 under review. In this alternative embodiment, the one or more found second application AP2 may be presented directly to the second device. The presentation may be similar to the complete list provided in relation to the first embodiment of FIG. 4.

As with the illustration of FIG. 4, the acts 520 to 535 are repeated as long as other applications AP1 are discovered on the first mobile device (answer Yes to act 535). Once no more application AP1 can be found (answer No to act 535), the present method will end in act 540.

The present embodiments of FIGS. 4 and 5 are illustrated assuming that after a first application AP1 is discovered on the first mobile device 101 by the ARC, one or more second applications AP2 are retrieved in the starter service database. As mentioned earlier, the SSN 140, through it application analyzer module 146, may request first a list of all applications AP1 available on the first mobile device. Then the starter list can be constructed using the application finder module 148, the application recommendation module 150 and the starter service database 160.

As mentioned previously in relation to the ARC client on the first mobile device, usage data for each application available on the first mobile device may be measured. Application data usage for a user will increase as the application is used, i.e. executed by the user.

The data usage may be measured through different means such as:
  the amount of time the application is run, i.e. executed on the mobile,
  the amount of data consumed by the application itself, when the application is an online application, over a data connection for instance with a distance server, the number of modules invoked by the user when the application comprises a plurality of modules. An example of such an application could be for instance a media player that provides a music module for listening to music, a video module for watching videos, a purchase module for buying new media, a radio module for listening to different radio channels . . . . With such an example, the user may become a true user if he has used at least 4 modules out of the various modules of the media player.

As seen later on, a combination of the different types of measurements may be used to determine the data usage. Consequently, the ARC may monitor:

more running time of AP1, and measured using the variable AUD_running_time, more data consumption by AP1, and measured using the variable AUD_data_consumed another module invoked by the user, and measured using the variable AUD_module_invoked.

Indeed the application usage data may be collected over discontinued periods of usage of AP1 by the user. The application usage data will increase each the user invokes and uses AP1. Using the hereabove different types of application usage data, the measured application usage data may be a vector of one, two or three values depending on the choice of data usage that is monitored, as illustrated in Matrix 1:

$$\begin{bmatrix} AUD\_running\_time \\ AUD\_data\_consumed \\ AUD\_modules\_invoked \end{bmatrix}$$

Matrix 1: example of an application usage data matrix

More values may be readily added by the man skilled in the art, like for instance, the number of times the user starts the application, if other application usage data are defined to better characterize a true user.

In an additional embodiment of the present system, acts 425 and 525 of FIGS. 4 and 5 respectively, may be conditioned to a predefined usage criterion. In other words, a second application linked to a first application available on the first mobile device may be retrieved only if the application usage data for said first application matches a predefined usage criterion. Such an embodiment may further assist the user in populating the second mobile device only with applications he has been using regularly.

A predefined usage data criterion may be provided by the SSN 140 or set by the user when registering with the present starter service; Using the matrix example of Matrix 1, such a criterion may be defined as:

$$\begin{bmatrix} AUD\_running\_time \le running\_time\_threshold \\ AUD\_data\_consumed \le data\_consumed\_threshold \\ AUD\_modules\_invoked \le modules\_invoked\_threshold \end{bmatrix}$$

Matrix 2: predefined usage criterion example

Depending on the number of monitored type of application usage data, each monitored application usage data may be compared to a predefined usage data threshold value to check if the criterion is matched.

Figure 6:
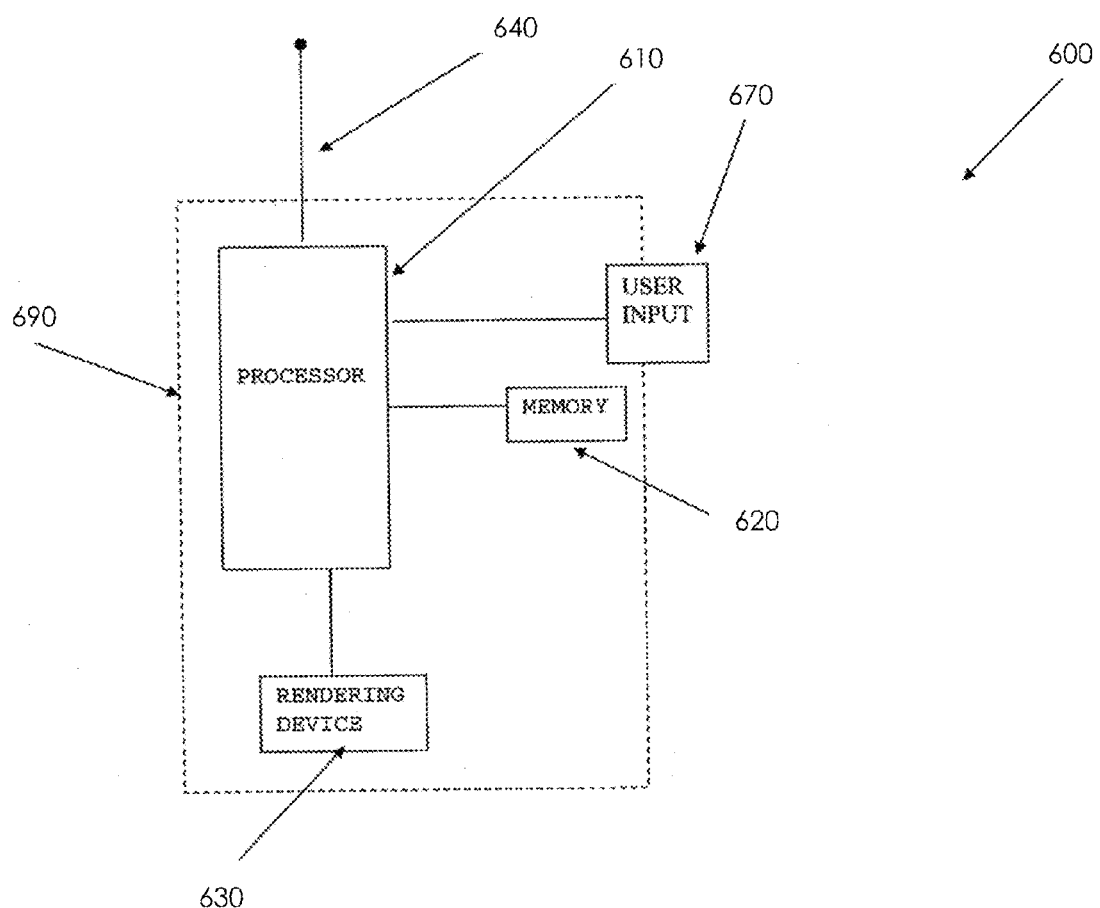
FIG. 6 shows another exemplary embodiment of the present system.

FIG. 6 shows a system 600 in accordance with an embodiment of the present system. The system 600 includes an application recommendation node 690 of a telecommunication network, and hosting an application recommendation service, or starter service according to the present system. Recommendation node 690 has a processor 610 operationally coupled to a memory 620, a rendering device 630, such as one or more of a display, speaker, etc., a user input device 670, such as a sensor panel, a keyboard, trackball and the likes, and a connection 640 operationally coupled to other entities and nodes of a telecommunication network. The connection 640 may be an operable connection between the recommendation node 690 and another node, server or device that has similar elements as recommendation node 690, such as the application market place hosted by an application market server, or a mobile device of a user, hosting an application market agent.

The memory 620 may be any type of device for storing for instance the application data related to the operating system of the recommendation node, as well as to application data in accordance with the present method. The application data are received by the processor 610 for configuring the processor 610 to perform operation acts in accordance with the present system. The operation acts include:

identifying the first and second application platforms respectively from the first and second electronic devices, receiving first metadata describing the one or more first applications installed on the first electronic device, retrieving from the application database one or more second applications from the second application platform that are linked with the one or more first applications, using the received first metadata, providing to either one of the first and second electronic devices a list of applications from the second application platform, said list comprising the one or more retrieved second applications.

The user input 670 may include a sensor panel as well as a keyboard, mouse, trackball, touchpad or other devices, which may be stand alone or be a part of a system, such as part of a personal computer (e.g., desktop computer, laptop computer, etc.) personal digital assistant, mobile phone, converged device, or other rendering device for communicating with the processor 610 via any type of coupling, such as a wired or wireless coupling. The user input device 670 is operable for interacting with the processor 610 including interaction within a paradigm of a GUI and/or other elements of the present system, such as to enable entry of data by an operator.

Clearly the recommendation node 690, the processor 610, memory 620, rendering device 630 and/or user input device 670 may all or partly be portions of a computer system or other device, and/or be embedded in one or more servers.

The system, device and method described herein address problems in prior art systems. In accordance with an embodiment of the present system, the application recommendation node may push to a second mobile device applications from a second app store similar to the application present on a first mobile device of a same user.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 620 or other memory coupled to the processor 610.

The computer-readable medium and/or memory 620 may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling, etc. Any medium known or developed that can store and/or transmit information suitable for use with a computer system may be used as the computer-readable medium and/or memory 620.

Additional memories may also be used. These memories configure processor 610 to implement the methods, operational acts, and functions disclosed herein. The operation acts may include controlling the rendering device 630 to render elements in a form of a GUI and/or controlling the rendering device 630 to render other information in accordance with the present system.

Moreover, the term "memory" should be construed broadly enough to encompass any information able to be read from or written to an address in the addressable space accessed by a processor. With this definition, information on a network is still within memory 620, for instance, because the processor 610 may retrieve the information from the network for operation in accordance with the present system. For example, a portion of the memory like the application database 160 understood herein may reside on different nodes of the telecommunication network.

The processor 610 is capable of performing operations in response to incoming user actions with and control over the application recommendation server, and executing instructions stored in the memory 620. The processor 610 may be an application-specific or general-use integrated circuit (s). Further, the processor 610 may be a dedicated processor for performing in accordance with the present system or may be a general-purpose processor wherein only one of many functions operates for performing in accordance with the present system. The processor 610 may operate utilizing a program portion, multiple program segments, or may be a hardware device utilizing a dedicated or multi-purpose integrated circuit.

Finally, the above discussion is intended to be merely illustrative of the present system and should not be construed as limiting the appended claims to any particular embodiment or group of embodiments. Thus, while the present system has been described with reference to exemplary embodiments of a mobile device, it should also be appreciated that numerous modifications and alternative embodiments may be devised by those having ordinary skill in the art without departing from the broader and intended spirit and scope of the present system as set forth in the claims that follow.

Indeed the present teaching may be transposable to any electronic device capable of running an application downloaded from an application market place, such as a general purpose computer, a PDA, a pad . . . . Additionally, the present teaching were illustrated with tow application stores indexed on the application database. The present method could be readily applied to more applications stores, by simply repeating the different acts for indexing the application stores.

Furthermore, the exemplary embodiment illustrated herein shown the application market place 121 and 122, and the application database 160 part of different systems. As an application market place may itself offer the present starter service, the application database may be under the control of one of the app stores.

Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specifications and drawings are to be regarded in an illustrative manner and are not intended to limit the scope of the appended claims.

In interpreting the appended claims, it should be understood that:

a) the words "comprising" or "including" do not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analogue and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for populating a second electronic device running a second operating system and registered for a user with applications from a second application market platform said second electronic device is operating with, using applications installed on a first electronic device registered for the same user, said first electronic device running a first operating system distinct from the second operating system and operating with a first application market platform, the applications being arranged to perform one or more functions when running on a processor of an electronic device, the method being carried out by an application recommendation node operatively coupled to an application database linking a plurality of applications from the first application market platform and operable to run on the first operating system with another plurality of applications from the second application market platform and operable to run on the second operating system, the links being based on a similarity criterion measuring similarities among the application functions, the method comprising the acts of:

identifying the first and second application market platforms of the first and second electronic devices, respectively, wherein the first and second platforms are associated with respective first and second distinct application market servers from which the first and second electronic devices can obtain the one or more first applications and the one or more second applications, respectively, for the first and second operating systems, receiving first metadata describing the one or more first applications installed on the first electronic device, including application usage data for the one or more first applications, only if the usage data matches a predefined usage criterion, retrieving from the application database one or more second applications from the second application market platform that are linked with the one or more first applications, using the received first metadata, wherein the predefined usage criterion comprises at least one of:
application running time, the predefined usage criterion being matched when the application running time exceeds a predefined running time threshold for the first application;
data consumed by the first application over a data connection with a distant server, the predefined usage criterion being matched when the data consumed by the first application exceeds a predefined consumed data threshold;
a number of modules of the first application invoked by the user when executing the first application, the predefined usage criterion being matched when the number of modules invoked for the first application by the user exceeds a predefined module threshold,
providing to either one of the first and second electronic devices a list of applications from the second application market platform, said list identifying the one or more retrieved second applications.

2. The method of claim 1, wherein in the providing act, the list of applications from the second application market platform is provided to the first device, for subsequent storing on a subscriber identity module of said first device.

3. The method of claim 1, further comprising preliminary acts of:
receiving for each application of at least the first and second application market platforms metadata characterizing said application, said application being arranged to perform one or more functions when running on an electronic device, and
linking in the application database an application from the first application market platform with an application from the second application market platform, using a similarity criterion applied to the received metadata and measuring similarities among application functions.

4. A recommendation node for populating a second electronic device running a second operating system and registered for a user with applications from a second application market platform said second electronic device is operating with, using applications installed on a first electronic device registered for the same user, said first electronic device running a first operating system distinct from the second operating system and operating with a first application market platform, the applications being arranged to perform one or more functions when running on a processor of an electronic device, the application recommendation node being operatively coupled to an application database linking a plurality of applications from the first application market platform and operable to run on the first operating system with another plurality of applications from the second application market platform and operable to run on the second operating system, the links being based on a similarity criterion measuring similarities among the application functions, the application recommendation node comprising:
a non-transitory computer-readable memory storing instructions;
a processor configured by the instructions to:
identify the first and second application market platforms of the first and second electronic devices, respectively, wherein the first and second platforms are associated with respective first and second distinct application market servers from which the first and second electronic devices can obtain the one or more first applications and the one or more second applications, respectively, for the first and second operating systems,
receive first metadata describing the one or more first applications installed on the first electronic device, including application usage data for the one or more first applications,
only if the usage data matches a predefined usage criterion, retrieve from the application database one or more second applications from the second application market platform that are linked with the one or more first applications, using the received first metadata, wherein the predefined usage criterion comprises at least one of:
application running time, the predefined usage criterion being matched when the application running time exceeds a predefined running time threshold for the first application;
data consumed by the first application over a data connection with a distant server, the predefined usage criterion being matched when the data consumed by the first application exceeds a predefined consumed data threshold;
a number of modules of the first application invoked by the user when executing the first application, the predefined usage criterion being matched when the number of modules invoked for the first application by the user exceeds a predefined module threshold,
provide to either one of the first and second electronic devices a list of applications from the second application market platform, said list identifying the one or more retrieved second applications.

5. A telecommunication system comprising:
a first and second application market platforms for providing applications to electronic devices operating respectively with said first and second application market platform, the applications being arranged to perform one or more functions when running on the electronic devices, wherein the first and second platforms are associated with respective first and second distinct application market servers,
a first electronic device of a first user, said first electronic device running a first operating system and operating with the first application market platform to obtain one or more applications from the first application market server,
a second electronic device of the same first user, said second electronic device running a second operating system distinct from the first operating system and operating with the second application market platform to obtain one or more applications from the second application market server,
an application database linking a plurality of applications from the first application market platform and operable to run on the first operating system with another plurality of applications from the second application market platform and operable to run on the second operating system, the links being based on a similarity criterion measuring similarities among the application functions,
a recommendation node for populating the second electronic device with applications from the second application market platform, using the applications installed on the first electronic device, said application recommendation node being configured to:

identify the first and second application market platforms of the first and second electronic devices, respectively, receive first metadata describing the one or more first applications installed on the first electronic device, including application usage data for the one or more first applications, only if the usage data matches a predefined usage criterion, retrieve from the application database one or more second applications from the second application market platform that are linked with the one or more first applications, using the received first metadata, wherein the predefined usage criterion comprises at least one of:

application running time, the predefined usage criterion being matched when the application running time exceeds a predefined running time threshold for the first application;

data consumed by the first application over a data connection with a distant server, the predefined usage criterion being matched when the data consumed by the first application exceeds a predefined consumed data threshold;

a number of modules of the first application invoked by the user when executing the first application, the predefined usage criterion being matched when the number of modules invoked for the first application by the user exceeds a predefined module threshold, provide to either one of the first and second electronic devices a list of applications from the second application market platform, said list identifying the one or more retrieved second applications.

6. A non-transmissible computer readable medium including computer program instructions stored thereon that cause a computer to implement a method for populating a second electronic device running a second operating system and registered for a user with applications from a second application market platform said second electronic device is operating with, using applications installed on a first electronic device running a first operating system distinct from the second operating system and registered for the same user, said first electronic device operating with a first application market platform, the applications being arranged to perform one or more functions when running on a processor of an electronic device, the method being carried out by an application recommendation node operatively coupled to an application database linking a plurality of applications from the first application market platform and operable to run on the first operating system with another plurality of applications from the second application market platform and operable to run on the second operating system, the links being based on a similarity criterion measuring similarities among the application functions, the instructions comprising:

instructions that configure the computer to identify the first and second application market platforms of the first and second electronic devices, respectively, wherein the first and second platforms are associated with respective first and second distinct application market servers from which the first and second electronic devices can obtain the one or more first applications and the one or more second applications, respectively, for the first and second operating systems, instructions that configure the computer to receive first metadata describing the one or more first applications installed on the first electronic device, including application usage data for the one or more first applications, instructions that configure the computer to, only if the usage data matches a predefined usage criterion, retrieve from the application database one or more second applications from the second application market platform that are linked with the one or more first applications, using the received first metadata, wherein the predefined usage criterion comprises at least one of:

application running time, the predefined usage criterion being matched when the application running time exceeds a predefined running time threshold for the first application;

data consumed by the first application over a data connection with a distant server, the predefined usage criterion being matched when the data consumed by the first application exceeds a predefined consumed data threshold;

a number of modules of the first application invoked by the user when executing the first application, the predefined usage criterion being matched when the number of modules invoked for the first application by the user exceeds a predefined module threshold, instructions that configure the computer to provide to either one of the first and second electronic devices a list of applications from the second application market platform, said list identifying the one or more retrieved second applications.

7. The method of claim 1, wherein the act of identifying the first and second platforms, comprises receiving from the first and second electronic devices indications of the first and second platforms.

8. The method of claim 1, wherein the act of providing the list of applications from the second application market platform comprises providing an identification of the respective application market server associated with the second application market platform, from which the one or more retrieved second applications may be obtained by the second electronic device and which is different than an application market server associated with the first application market platform, from which the one or more first applications may be obtained by the first electronic device.

9. The method of claim 8, wherein providing an identification of a respective application market server associated with the second application market platform, comprises providing an address in the respective application market server from which the one or more retrieved second applications may be obtained by the second electronic device.

* * * * *